(12) United States Patent
Wang et al.

(10) Patent No.: US 9,049,456 B2
(45) Date of Patent: Jun. 2, 2015

(54) INTER-LAYER PREDICTION FOR EXTENDED SPATIAL SCALABILITY IN VIDEO CODING

(75) Inventors: Xianglin Wang, Santa Clara, CA (US); Justin Ridge, Sachse, TX (US)

(73) Assignee: Nokia Corporation, Espoo (FI)

( * ) Notice: Subject to any disclaimer, the term of this patent is extended or adjusted under 35 U.S.C. 154(b) by 1467 days.

(21) Appl. No.: 11/970,486

(22) Filed: Jan. 7, 2008

(65) Prior Publication Data

US 2008/0165855 A1    Jul. 10, 2008

Related U.S. Application Data

(60) Provisional application No. 60/884,008, filed on Jan. 8, 2007.

(51) Int. Cl.
| | | |
|---|---|---|
| *H04N 19/59* | (2014.01) | |
| *H04N 19/105* | (2014.01) | |
| *H04N 19/176* | (2014.01) | |
| *H04N 19/51* | (2014.01) | |
| *H04N 19/513* | (2014.01) | |
| *H04N 19/103* | (2014.01) | |

(Continued)

(52) U.S. Cl.
CPC ............. *H04N 19/59* (2013.01); *H04N 19/105* (2013.01); *H04N 19/176* (2013.01); *H04N 19/51* (2013.01); *H04N 19/513* (2013.01); *H04N 19/103* (2013.01); *H04N 19/109* (2013.01); *H04N 19/33* (2013.01)

(58) Field of Classification Search
CPC ....................................................... H04N 7/50

USPC ......................................... 375/240.16, 240.26
See application file for complete search history.

(56) References Cited

U.S. PATENT DOCUMENTS

| 7,519,230 B2 * | 4/2009 | Wittebrood et al. .......... 382/236 |
| 2002/0075959 A1 * | 6/2002 | Dantwala ................. 375/240.16 |
| 2004/0081238 A1 * | 4/2004 | Parhy ....................... 375/240.16 |

(Continued)

FOREIGN PATENT DOCUMENTS

| EP | 1 694 074 | 8/2006 |
| EP | 1 848 218 A1 | 10/2007 |

(Continued)

OTHER PUBLICATIONS

English Translation of Office Action in corresponding Chinese Application 200880005411.2, Dec. 23, 2010.

(Continued)

*Primary Examiner* — Hassan Kizou
*Assistant Examiner* — Ashil Farahmand
(74) *Attorney, Agent, or Firm* — Alston & Bird LLP

(57) ABSTRACT

An improved system and method for providing improved inter-layer prediction for extended spatial scalability in video coding, as well as improving inter-layer prediction for motion vectors in the case of extended spatial scalability. In various embodiments, for the prediction of macroblock mode, the actual reference frame index and motion vectors from the base layer are used in determining if two blocks should be merged. Additionally, multiple representative pixels in a 4×4 block can be used to represent each 4×4 block in a virtual base layer macroblock. The partition and motion vector information for the relevant block in the virtual base layer macroblock can be derived from all of the partition information and motion vectors of those 4×4 blocks.

20 Claims, 8 Drawing Sheets

(51) Int. Cl.
*H04N 19/109* (2014.01)
*H04N 19/33* (2014.01)

(56) References Cited

U.S. PATENT DOCUMENTS

| | | |
|---|---|---|
| 2005/0265451 A1 | 12/2005 | Shi et al. |
| 2006/0072790 A1* | 4/2006 | Wittebrood et al. .......... 382/107 |
| 2006/0093036 A1 | 5/2006 | Park et al. |
| 2006/0133482 A1 | 6/2006 | Park |
| 2006/0233254 A1 | 10/2006 | Lee et al. |
| 2008/0165855 A1* | 7/2008 | Wang et al. .............. 375/240.16 |

FOREIGN PATENT DOCUMENTS

| | | |
|---|---|---|
| RU | 2201654 C2 | 3/2003 |
| RU | 2 201 654 C2 | 3/2007 |
| TW | 200607355 | 2/2006 |
| TW | I255652 | 5/2006 |
| WO | WO 2004/004358 A1 | 1/2004 |
| WO | WO 2006/058921 | 6/2006 |
| WO | WO-2006/058921 | 6/2006 |
| WO | WO 2006/087314 | 8/2006 |
| WO | WO 2006/087314 A1 | 8/2006 |
| WO | WO 2006/110013 A1 | 10/2006 |
| WO | WO 2007/081133 | 7/2007 |

OTHER PUBLICATIONS

International Search report for PCT Application No. PCT/IB2008/050022.
Richardson, Iain. "H.264 and MPEG-4 Video Compression: Video Coding for Next-Generation Multimedia". pp. 175-176, pp. 226-234.
Office Action for Russian Application No. 2009130154/09(042008) dated Mar. 5, 2010.
Notice of Allowance for Russian Application No. 2009130154/09(042008) dated Jan. 28, 2011.
Intellectual Property Office, Ministry of Economic Affairs, Republic of China, Search Report of Application No. 097100557, dated Nov. 8, 2012, 1 page, Taiwan.
Extended European Search Report for Application No. 08700203.6; dated May 28, 2013.
"*Joint Scalable Video Model JSVM-8;*" Joint Video Team (JVT) of ISO/IEC MPEG & ITU-T VCEG (ISO/IEC JTC1/SC29/WG11 and ITU-T SG16 Q.6) 21$^{st}$ Meeting; pp. 1-46; dated Oct. 20-27, 2006.

* cited by examiner

INTER-LAYER PREDICTION FOR EXTENDED SPATIAL SCALABILITY IN VIDEO CODING

CROSS-REFERENCE TO RELATED APPLICATIONS

The present application claims priority to U.S. Provisional Patent Application No. 60/884,008, filed Jan. 8, 2007.

FIELD OF THE INVENTION

This invention relates generally to the field of video coding. More particularly, the present invention relates to scalable video coding that supports extended spatial scalability.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Different standards have been specified for different technologies. Video coding standards include the ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 Advanced Video Coding (AVC) or, in short, H.264/AVC). In addition, there are currently efforts underway to develop new video coding standards. One such standard under development is the scalable video coding (SVC) standard, which will become the scalable extension to the H.264/AVC standard. The latest draft of the SVC is Annex F (now Annex G) of the H.264/Advanced Video Coding (AVC) standard. In particular, Annex F includes a feature known as extended spatial scalability (ESS), which provides for the encoding and decoding of signals in situations where the edge alignment of a base layer macroblock (MB) and an enhancement layer macroblock is not maintained. When spatial scaling is performed with a ratio of 1 or 2 and a macroblock edge is aligned across different layers, it is considered to be a special case of spatial scalability.

For example, when utilizing dyadic resolution scaling (i.e., scaling resolution by a power of 2), the edge alignment of macroblocks can be maintained. This phenomenon is illustrated in FIG. 1, where a half-resolution frame on the left (the base layer frame 1000) is upsampled to give a full resolution version of the frame on the right (an enhancement layer frame 1100). Considering the macroblock $MB_0$ in the base layer frame 1000, the boundary of this macroblock after upsampling is shown as the outer boundary in the enhancement layer frame 1100. In this situation, it is noted that the upsampled macroblock encompasses exactly four full-resolution macroblocks—$MB_1$, $MB_2$, $MB_3$ and $MB_4$—at the enhancement layer. The edges of the four enhancement layer macroblocks $MB_1$, $MB_2$, $MB_3$ and $MB_4$ exactly correspond to the upsampled boundary of the macroblock $MB_0$. Importantly, the identified base layer macroblock macroblock is the only base layer macroblock covering each of the enhancement layer macroblocks $MB_1$, $MB_2$, $MB_3$ and $MB_4$. In other words, no other base layer macroblock is needed to form a prediction for $MB_1$, $MB_2$, $MB_3$ and $MB_4$.

In the case of non-dyadic scalability, on the other hand, the situation is quite different. This is illustrated in FIG. 2 for a scaling factor of 1.5. In this case, the base layer macroblocks $MB_{10}$ and $MB_{20}$ in the base layer frame 2000 are upsampled from 16×16 to 24×24 in the higher resolution enhancement layer frame 2100. However, considering the enhancement layer macroblock $MB_{30}$, it is clearly observable that this macroblock is covered by two different up-sampled macroblocks—$MB_{10}$ and $MB_{20}$. Thus, two base-layer macroblocks, $MB_{10}$ and $MB_{20}$, are required in order to form a prediction for the enhancement layer macroblock $MB_{30}$. In fact, depending upon the scaling factor that is used, a single enhancement layer macroblock may be covered by up to four base layer macroblocks.

In the current draft of Annex F of the H.264/AVC standard, it is possible for an enhancement layer macroblock to be coded relative to an associated base layer frame, even though several base layer macroblocks may be needed to form the prediction. Because coding efficiency is closely related to prediction accuracy, it is desirable to form an accurate prediction of the enhancement layer macroblock to improve coding efficiency.

According to the current draft of Annex F of the H.264/AVC standard, a number of aspects of a current enhancement layer macroblock can be predicted from its corresponding base layer macroblocks. For example, intra-coded macroblocks (also referred to as intra-macroblocks or intra-MBs) from the base layer are fully decoded and reconstructed so that they may be upsampled and used to directly predict the luminance and chrominance pixel values at a corresponding enhancement layer. Additionally, inter-coded macroblocks (also referred to as inter-macroblocks or inter-MBs) from the base layer are not fully reconstructed. Instead, only a prediction residual of each base layer inter-MB is decoded and may be used to predict an enhancement layer prediction residual, but no motion compensation is performed on the base layer inter-MB. This is referred as "residual prediction". Furthermore, for inter-MBs, base layer motion vectors are also upsampled and used to predict enhancement layer motion vectors.

In addition to the above, in Annex F of the H.264/AVC standard, a flag named base_mode_flag is defined for each enhancement layer macroblock. When this flag is equal to 1, then the type, mode and motion vectors of the enhancement layer macroblock should be fully-predicted (or inferred) from its base layer MB(s). Because the same method for deriving macroblock type, mode and motion vectors of an enhancement layer macroblock from base layer MB(s) is known to both the encoder and the decoder, it is unnecessary to further code the macroblock type and mode, as well as its motion vector information into bitstream in this case. If the base_mode_flag is equal to 0, then the macroblock type and mode information of an enhancement layer macroblock is not inferred.

As discussed above, the macroblock type and mode information of an enhancement layer macroblock can be fully predicted from its base layer MB(s) in certain situations. According to the current draft of Annex F of the H.264/AVC standard, when enhancement layer macroblocks are not edge-aligned with base layer macroblocks, for each enhancement layer macroblock, a virtual base layer macroblock is derived based on the base layer macroblocks that cover the enhancement layer macroblock. The type, mode and motion vectors of the virtual base layer macroblock are all determined based on the base layer MB(s). The virtual base layer macroblock will then be considered as the only macroblock from base layer that exactly covers this enhancement layer macroblock.

If the base_mode_flag is equal to 1 for the current enhancement layer macroblock, then its type, mode and motion vectors are set as the same as those of the virtual base layer macroblock.

The method defined in the current draft of Annex F of the H.264/AVC standard for determining the type, mode and motion vectors of the virtual base layer macroblock is a bottom-up process. First, for each 4×4 block of the virtual base layer macroblock, one pixel located in the second row and second column in the block is used as a representative point for the block, which is shown in FIG. 3. In FIG. 3, the macroblock is represented at 300. The 4×4 blocks inside the macroblock are represented at 310, and the representative pixel within each 4×4 block is represented at 320. The use of one pixel in each 4×4 block of the virtual base layer macroblock has the advantage of simplicity when the current 4×4 block in virtual base layer macroblock is covered by only one 4×4 block from base layer. But when it is covered by multiple 4×4 blocks from base layer, such a method may not be accurate.

FIGS. 4(a) and 4(b) show the relationship between the virtual base layer macroblock 300 and corresponding base layer macroblock(s). The area in the base layer that, after upsampling, would exactly cover the current enhancement layer macroblock is represented at 410 in FIG. 4(b). This is also the area that corresponds to the virtual base layer macroblock 300. A representative pixel in a 4×4 block in the virtual base layer macroblock 300 is labeled as $p_e$. Its corresponding pixel at the base layer is $p_b$. According to the current draft of Annex F of the H.264/AVC standard, the macroblock partition information of the 4×4 block at the base layer, denoted as 420 in FIG. 4(b), in which $p_b$ is located is used as the partition information for the 4×4 block at enhancement layer in which $p_e$ is located. In other words, the partition information of the 4×4 block at the base layer that covers the pixel $p_e$ is used as the partition information for the 4×4 block in which $p_e$ is located. In this way, each 4×4 block in the virtual base layer macroblock 300 can have partition information. Motion vectors associated with the partition information are also used as predictors for enhancement layer motion vectors.

Within each of the four 8×8 blocks in the virtual base layer macroblock, a block merging process is activated at the 4×4 block level. As shown in FIG. 5, if block 1, 2, 3 and 4 all derive their partition from the same single partition from the base layer, then the mode of the 8×8 block is set as 8×8. Otherwise, if block 1 and block 2 derive their partition from a same one partition from the base layer, and block 3 and block 4 also derive their partition from another same one partition from the base layer, then the mode of the 8×8 block is determined as 8×4. Similarly, if block 1 and block 3 have the same partition, and block 2 and block 4 also have the same partition from the base layer, then the mode of the 8×8 block is determined as 4×8. Otherwise, the mode of the 8×8 block is determined as 4×4. This process is repeated separately inside all of the other three 8×8 blocks.

If all four 8×8 blocks are in 8×8 mode, a block merging process is also performed at the 8×8 block level as shown in FIG. 6. In FIG. 6, blocks 1, 2, 3 and 4 all represent an 8×8 block. If block 1, 2, 3 and 4 all derive their partition from the same single partition from the base layer, then the mode of the virtual base layer macroblock is determined to be 16×16. If block 1 and block 2 have the same partition, and block 3 and block 4 also have the same partition from the base layer, then the mode of the virtual base layer macroblock is determined as 16×8. If block 1 and block 3 have the same partition, and block 2 and block 4 also have the same partition, then the mode of the virtual base layer macroblock is set as 8×16. Otherwise, the mode of virtual base layer macroblock is set as 8×8.

According to the current draft of Annex F of the H.264/AVC standard, the predicting of macroblock mode is solely based on the partition information from the base layer. In this arrangement, blocks can only be merged when the blocks share the same partition information from the base layer. However, in the case of extended spatial scalability, it is quite common for different partitions from the base layer to have the same reference frame index and motion vectors. For example, two neighboring macroblocks from the base layer can have the same reference frame index and motion vectors. Additionally, in the case of extended spatial scalability, it is very common for an enhancement layer macroblock to be covered by multiple macroblocks from the base layer. Therefore the use of only partition information in determining if two blocks should be merged or not often unnecessarily creates small partitions inside of a macroblock. Such small partitions increase computation complexity during sample interpolation processes in motion compensation.

In light of the above, it would be desirable to provide a system for improved inter-layer prediction for macroblock mode, as well as motion vectors for the case of extended spatial scalability.

SUMMARY OF THE INVENTION

Various embodiments of the present invention provide a system and method for improving inter-layer prediction for the macroblock mode for the above-described case of extended spatial scalability. The various embodiments also provide a system and method for improving inter-layer prediction for motion vectors in the case of extended spatial scalability. Conventional systems for predicting macroblock mode are based solely on partition information from the base layer; only when blocks share the same partition information from the base layer can they can be merged. In embodiments of the present invention, on the other hand, the merging process comprises relying on reference frame index and motion vector information. When blocks share the same reference frame index and motion vector information from the base layer, these blocks may be merged when applicable. Therefore, even when two blocks have different partitions from the base layer, it may be possible for them to be merged together. This system and method can avoid unnecessarily creating small block partitions, which will in turn reduce computation complexity in the interpolation process of motion compensation.

Various embodiments provide a method, computer program product and apparatus for encoding an enhancement layer block representing at least a portion of a video frame within a scalable bit stream, whereby a coding mode indicator specifying a partition of the enhancement layer block based at least in part on a plurality of reference frame index values corresponding to a plurality of reference layer blocks is derived, wherein the reference layer blocks that have the same reference frame index are merged to derive the partition size. The enhancement layer block is encoded utilizing the coding mode indicator. Embodiments also provide a method, computer program product and apparatus for decoding an enhancement layer block representing at least a portion of a video frame within a scalable bit stream, whereby a coding mode indicator specifying a partition of the enhancement layer block based at least in part on a plurality of reference frame index values corresponding to a plurality of reference layer blocks is derived, wherein the reference layer blocks that have the same reference frame index are merged to derive the partition size. The enhancement layer block is decoded utilizing the coding mode indicator.

Other embodiments provide a method, computer program product and apparatus for encoding an enhancement layer block representing at least a portion of a video frame within a scalable bit stream, whereby partition and motion vector information is derived for the enhancement layer block based upon partition and motion vector information from at least one of a plurality of reference blocks. The enhancement layer block is encoded utilizing the partition and motion vector information. Still other embodiments provide a method, computer program product and apparatus for decoding an enhancement layer block representing at least a portion of a video frame within a scalable bit stream, whereby partition and motion vector information is derived for the enhancement layer block based upon partition and motion vector information from at least one of a plurality of reference blocks. The enhancement layer block is decoded utilizing the partition and motion vector information.

In another embodiment of the present invention, the condition for block merging can be loosened. In this embodiment, so long as the blocks share the same reference frame index and similar motion vectors, neighboring blocks can be merged together. Motion vectors for the merged larger block are derived from the motion vectors of the blocks to be merged (pre-merging).

Additionally, each 4×4 block in a virtual base layer macroblock has conventionally been essentially represented by a single pixel located at the second row and second column in the block, and partition information for the current block has been obtained by mapping the representative pixel to base layer and then locating a 4×4 block at base layer. In contrast, in the various embodiments of the present invention, multiple representative pixels in a 4×4 block can be used to represent the block. When multiple 4×4 blocks are available at the base layer for a current block in the virtual base layer macroblock, the partition and motion vector information for the current block in the virtual base layer macroblock can be derived from all of the partition information and motion vectors of those 4×4 blocks. When using more than one representative pixel in a 4×4 block in deriving partition as well as motion vector information from the base layer, it is possible to obtain a more accurate prediction of motion vectors at the enhancement layer. Such an improved prediction of motion vectors can thereby improve coding efficiency.

The various embodiments of the present invention can be implemented directly in software using any common programming language, e.g. C/C++ or assembly language. The embodiments of the present invention can also be implemented in hardware and used in consumer devices.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Various embodiments of the present invention provide a system and method for improving inter-layer prediction for the macroblock mode for the above-described case of extended spatial scalability. The various embodiments also provide a system and method for improving inter-layer prediction for motion vectors in the case of extended spatial scalability. Conventional systems for predicting macroblock mode are based solely on partition information from the base layer; only when blocks share the same partition information from the base layer can they can be merged. In embodiments of the present invention, on the other hand, the merging process comprises relying on reference frame index and motion vector information. When blocks share the same reference frame index and motion vector information from the base layer, these blocks may be merged when applicable. Therefore, even when two blocks have different partitions from the base layer, it may be possible for them to be merged together.

In another embodiment of the present invention, the condition for block merging can be loosened. In this embodiment, so long as the blocks share the same reference frame index and similar motion vectors, neighboring blocks can be merged together. Motion vectors for the merged larger block are derived from the motion vectors of the blocks to be merged (pre-merging).

Additionally, each 4×4 block in a virtual base layer macroblock has conventionally been essentially represented by a single pixel located at the second row and second column in the block, and partition information for the current block has been obtained by mapping the representative pixel to base layer and then locating a 4×4 block at base layer. In contrast, in the various embodiments of the present invention, multiple representative pixels in a 4×4 block can be used to represent the block. When multiple 4×4 blocks are available at the base layer for a current block in the virtual base layer macroblock, the partition and motion vector information for the current block in the virtual base layer macroblock can be derived from all of the partition information and motion vectors of those 4×4 blocks. When using more than one representative pixel in a 4×4 block in deriving partition as well as motion vector information from the base layer, it is possible to obtain a more accurate prediction of motion vectors at the enhancement layer.

According to the various embodiments of the present invention, the method for determining the type, mode and motion vectors of the virtual base layer macroblock is still a bottom-up process. However, a number of changes are implemented to achieve the improvements discussed above.

Figure 1:
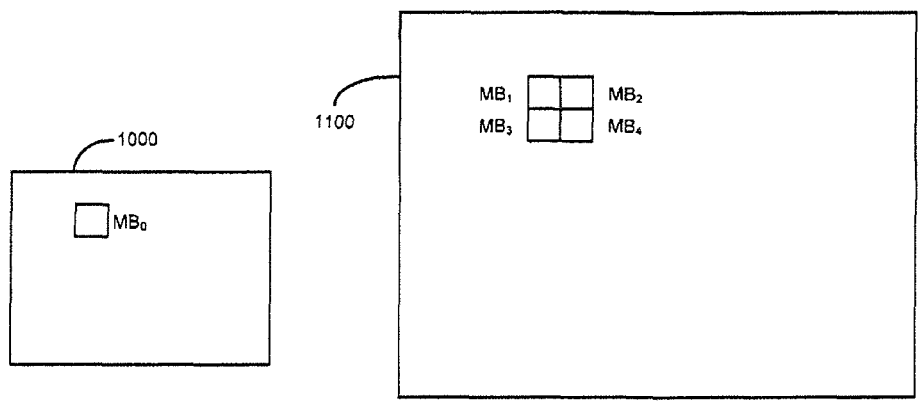
FIG. 1 is shows the positioning of macroblock boundaries in dyadic resolution scaling.
Figure 2:
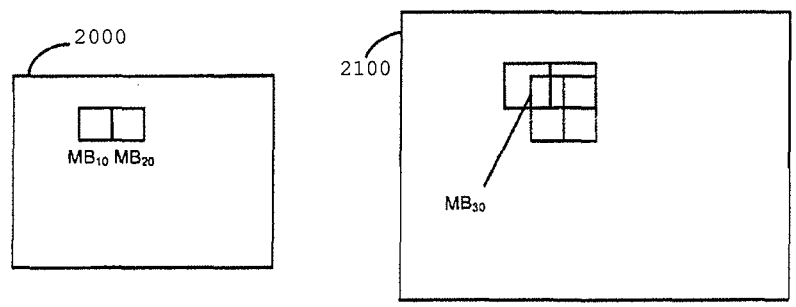
FIG. 2 is a shows the positioning of macroblock boundaries in non-dyadic resolution scaling.
Figure 3:
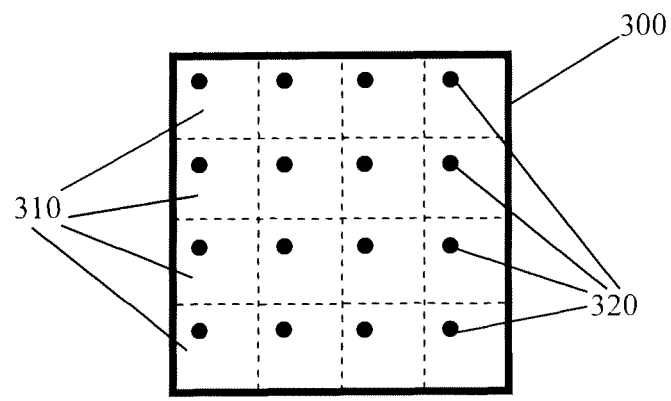
FIG. 3 is a representation of a virtual base layer macroblock, with a representative pixel in each of sixteen 4×4 blocks.
Figure 4A:
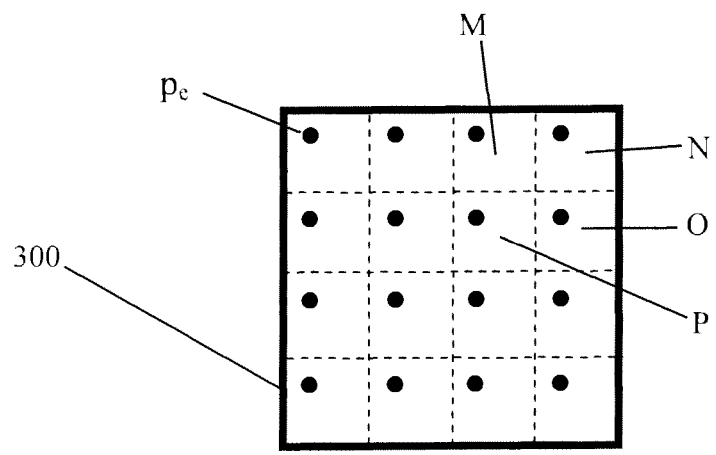
FIG. 4(a) is a representation of a virtual base layer macroblock.
Figure 4B:
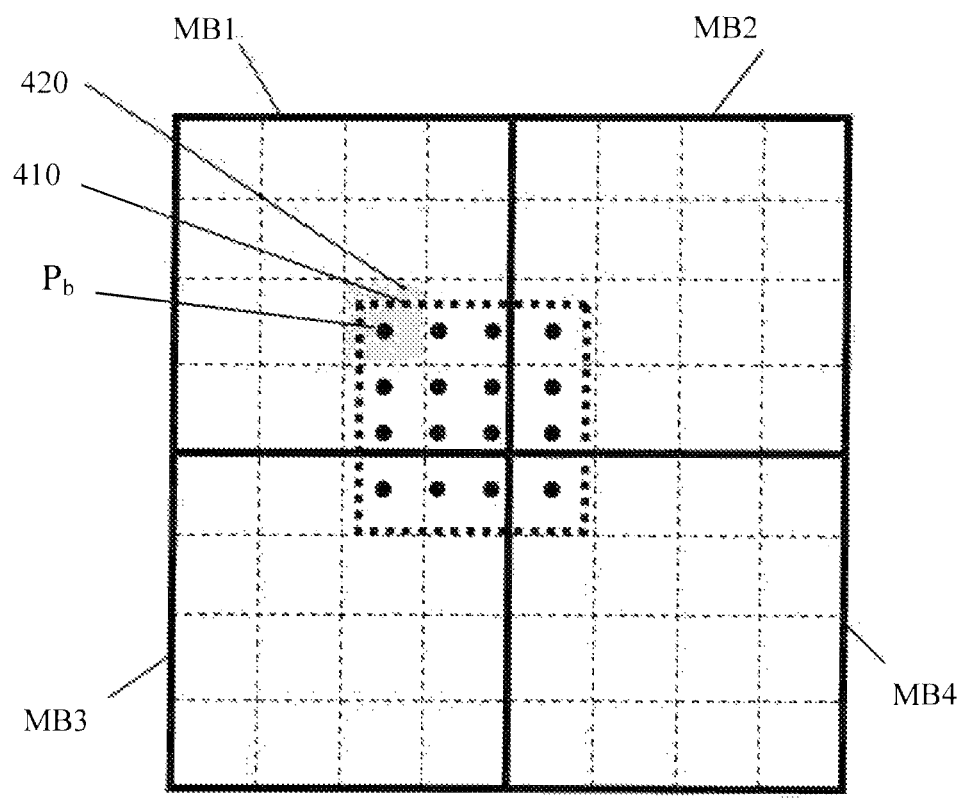
FIG. 4(b) shows the relationship between the virtual base layer macroblock of FIG. 4(a) and a plurality of base layer macroblocks.
Figure 5:
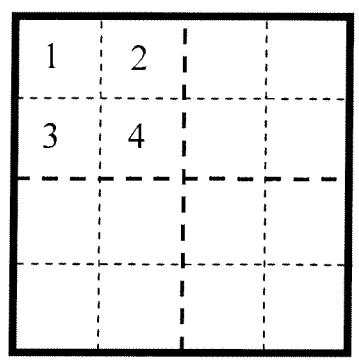
FIG. 5 shows how blocks may be merged at the 4×4 block level in a virtual base layer macroblock in accordance with Annex F of the H.264/AVC standard
Figure 6:
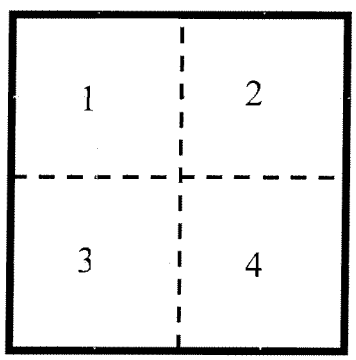
FIG. 6 shows how blocks may be merged at the 8×8 block level in a virtual base layer macroblock in accordance with Annex F of the H.264/AVC standard.

In terms of block merging, two blocks are merged if they have the same reference frame index and similar or identical motion vectors from the base layer. As shown in FIG. 4(*b*), it can be assumed for exemplary purposes that base layer $MB_1$ and base layer $MB_2$ both have an inter 16×16 mode and in addition, have the same reference frame index and motion vectors. According to the relationship shown in FIGS. 4(*a*) and 4(*b*), the 4×4 blocks M and P in virtual base layer macroblock gets partition information from base layer MB1, while 4×4 block N and Q get partition information from base layer MB2. According to one embodiment of the present invention, it is possible for blocks M, N, P and Q to be merged because they all have the same reference frame index and motion vector information from the base layer. After merging, the mode for the 8×8 block is 8×8. However, according to the method currently defined in Annex F of the H.264/AVC standard, such a merging would not be permitted because they are from different base layer macroblocks and thus belong to different partitions. After merging using the conventional rules, the mode for the 8×8 block would be 4×8, even though such a sub-partition is unnecessary. Furthermore, due to such unnecessary sub-partitioning, further block merging could also be impossible. For example, if it is assumed in FIG. 4 that base layer macroblocks MB3 and MB4 also have an inter 16×16 mode and have the same reference frame index and motion vectors as MB1 and MB2, then according to embodiments of the present invention, the blocks in the virtual base layer macroblock 300 will eventually be all merged together, and a mode of inter 16×16 will be assigned to the virtual base layer. However, with the method currently defined in Annex F of the H.264/AVC standard, the mode for the virtual base layer macroblock 300 would be 8×8, with some 8×8 blocks having further sub-partitions.

Although the use of unnecessarily small partitions may not affect coding efficiency, it may affect computation complexity. During the motion compensation process, sample interpolation is generally performed on a partition or sub-partition basis. Interpolation on a larger partition generally has less complexity than on a number of smaller partitions that have the same total size as the larger partition. This is primarily because, when performing interpolation on a larger partition, more intermediate data can be shared and utilized to reduce computation complexity.

In another embodiment of the present invention, the condition for block merging can be loosened to a certain extent. As long as they share the same reference frame index and similar motion vectors, neighboring blocks can be merged together. The similarity of motion vectors can be measured through a predetermined threshold $T_{mv}$. Assuming two motion vectors are $(\Delta x_1, \Delta y_1)$, $(\Delta x_2, \Delta y_2)$, respectively, the difference between the two motion vectors can be expressed as: $D((\Delta x_1, \Delta y_1), (\Delta x_2, \Delta y_2))$. In this instance, D is a certain distortion measure. For example, the distortion measure can be defined as the sum of the squared differences between the two vectors. The distortion measure can also be defined as the sum of absolute differences between the two vectors. As long as $D((\Delta x_1, \Delta_1), (\Delta x_2, \Delta y_2))$ is not larger than the threshold $T_{mv}$, then the two motion vectors are considered to be similar.

The threshold $T_{mv}$ can be defined as a number, e.g. $T_{mv}=0$, 1 or 2, etc. $T_{mv}$ can also be defined as a percentage number, such as within 1% of $(\Delta x_1, \Delta y_1)$ or $(\Delta x_2, \Delta y_2)$ etc. Some other forms of definition of $T_{mv}$ are also allowed. When $T_{mv}$ is equal to 0, it requires that $(\Delta x_1, \Delta y_1)$ and $(\Delta x_2, \Delta y_2)$ be exactly the same, which is the condition described in the embodiment of the invention discussed previously.

Motion vectors for the merged larger block are derived from the motion vectors of those blocks before merging. The derivation method can be based on different criteria. For example, the derived motion vector can be an average or a weighted average of the motion vectors of those blocks before merging. It can also be the median of those motion vectors.

Figure 7:
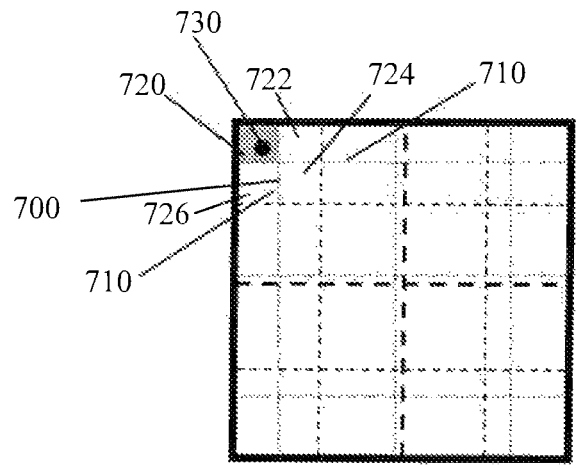
FIG. 7 is a representation showing a 4×4 block being covered by multiple 4×4 blocks from a base layer, when a single representative pixel is used in accordance with Annex F of the H.264/AVC standard.

The following describes the derivation of partition information and motion vectors for a 4×4 block. As discussed previously, in the case of extended spatial scalability, it is possible for a 4×4 block in an enhancement layer macroblock (as well as a virtual base layer MB) to be covered by up to four base layer 4×4 blocks. If a single pixel is used in the 4×4 block as a representative for the block, then one of the base layer 4×4 blocks is selected, and the selected block's partition and motion vector information is used as prediction of the current 4×4 block. Such a method may not be accurate, as is demonstrated in FIG. 7. In FIG. 7, the borders of upsampled 4×4 blocks from the base layer are represented at 700. It can be seen that the first 4×4 block 710 in the virtual base layer macroblock is actually covered by four 4×4 blocks 720, 722, 724 and 726 from the base layer. When using a representative pixel (indicated at 730 in FIG. 7), one of the four 4×4 blocks from the base layer (720 in FIG. 7) is chosen, and its partition and motion vector information is used as prediction for the first 4×4 block 710, even if the other three 4×4 blocks may have different partition and motion vector information.

Figure 8:
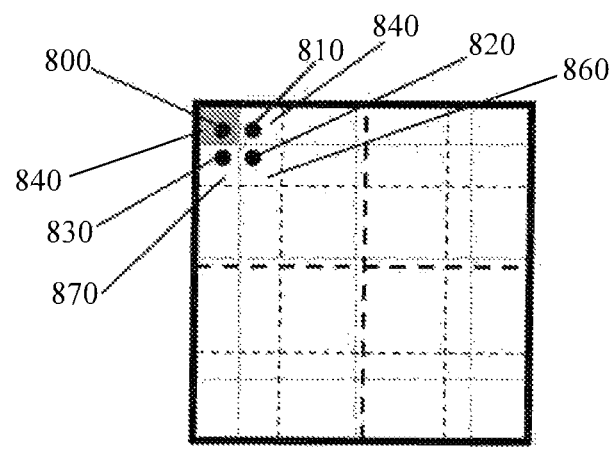
FIG. 8 is a representation showing the use of multiple representative pixels in a 4×4 block in accordance with an embodiment of the present invention.

In an embodiment of the present invention, instead of using one pixel as a representative for the 4×4 block, a number of pixels can be used as representatives in deriving the partition and motion vector information from the base layer for the current 4×4 block. For example, as indicated in FIG. 8, four samples 800, 810, 820 and 830 can be used as representative pixels for a 4×4 block 840. For each representative samples, a corresponding base layer 4×4 block can be located, with the base layer 4×4 blocks being 840, 850, 860 and 870 in FIG. 8. In total, there can be up to four 4×4 blocks from the base layer. The partition and motion vector information for the current 4×4 block can then be derived from that of the four 4×4 blocks from the base layer.

To derive partition and motion vector information from multiple 4×4 blocks from the base layer, the following rules are applied in one embodiment. First, when the 4×4 blocks from the base layer have different reference frame indexes, then the block with smaller reference frame index value should be selected. Second, when more than one 4×4 block from the base layer have the smallest reference frame index value, an average or a weighted average of the motion vectors of the 4×4 blocks should be calculated and used as the prediction for the motion vectors in the current 4×4 block. Third, when the weighted average operation described above is used, the weighting coefficient for each motion vector from the base layer can be determined based on a number of factors. These factors include, but not limited to, the size of the area the motion vector represents inside the current 4×4 block, its delta motion vector (i.e. the differential motion vector between a motion vector and its neighboring motion vectors), the motion vector's partition size, the motion vector's macroblock type and mode, etc.

Figure 9:
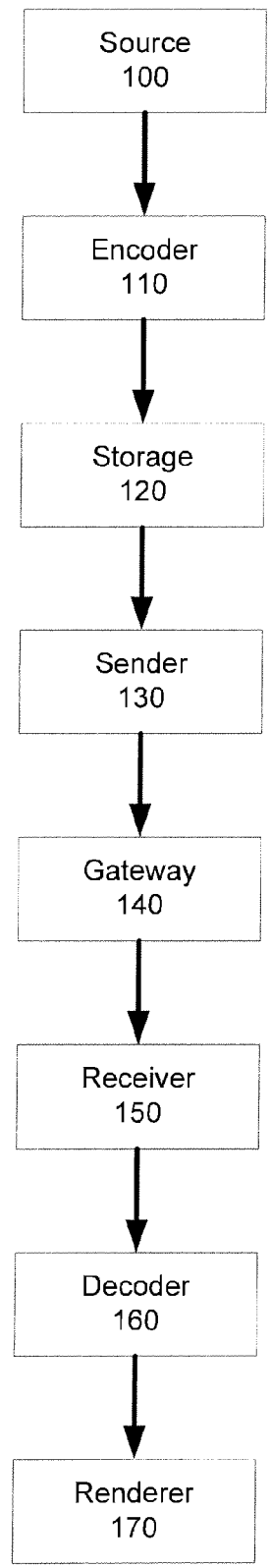
FIG. 9 shows a generic multimedia communications system for use with the various embodiments of the present invention.

FIG. 9 shows a generic multimedia communications system for use with the present invention. As shown in FIG. 4, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

The system includes one or more receivers 150, typically capable of receiving, de-modulating, and de-capsulating the transmitted signal into a coded media bitstream. The coded media bitstream is typically processed further by a decoder 160, whose output is one or more uncompressed media streams. It should be noted that the bitstream to be decoded can be received from a remote device located within virtually any type of network. Additionally, the bitstream can be received from local hardware or software. Finally, a renderer 170 may reproduce the uncompressed media streams with a loudspeaker or a display, for example. The receiver 150, decoder 160, and renderer 170 may reside in the same physical device or they may be included in separate devices.

Figure 10:
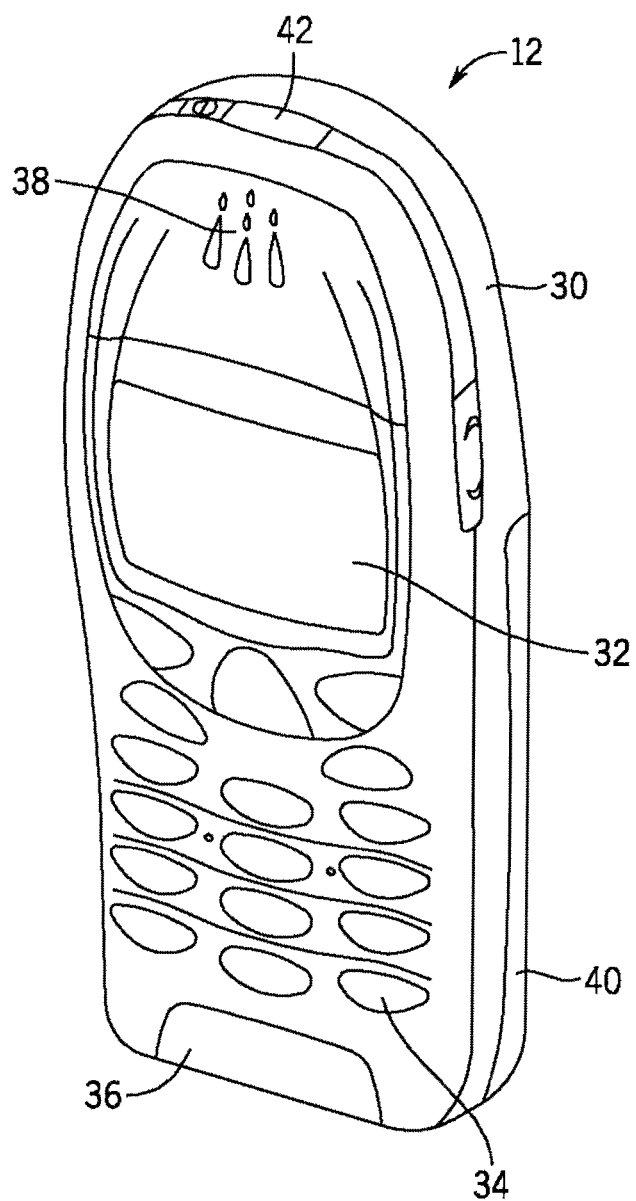
FIG. 10 is a perspective view of a communication device that can be used in the implementation of the present invention.
Figure 11:
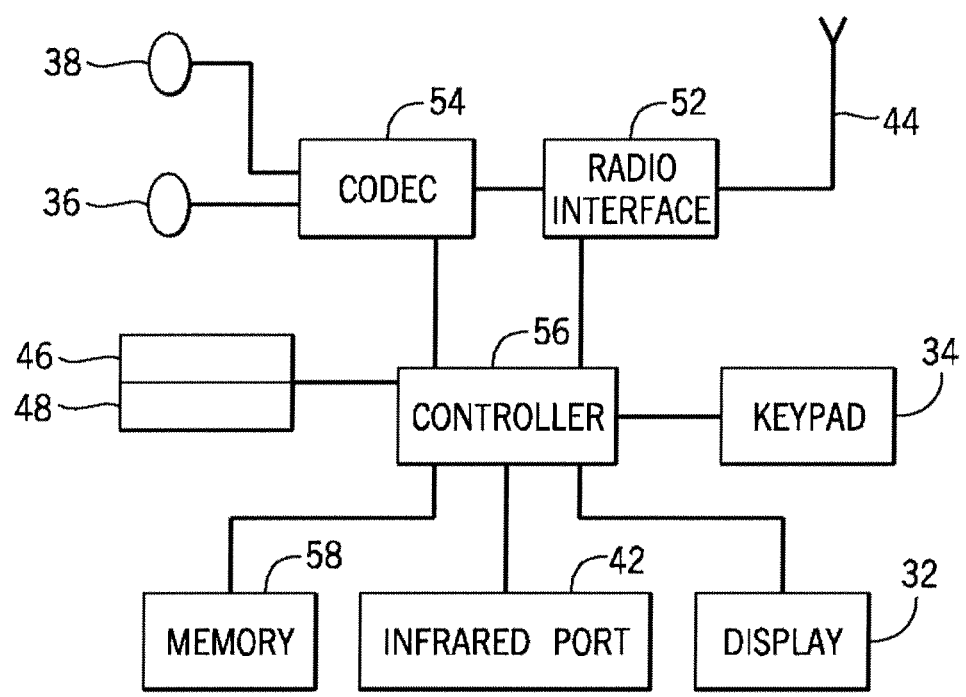
FIG. 11 is a schematic representation of the telephone circuitry of the communication device of FIG. 10.

FIGS. 10 and 11 show one representative communication device 12 within which the present invention may be implemented. It should be understood, however, that the present invention is not intended to be limited to one particular type of communication device 12 or other electronic device. The communication device 12 of FIGS. 10 and 11 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56, a memory 58 and a battery 80. Individual circuits and elements are all of a type well known in the art, for example in the Nokia range of mobile telephones.

Communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

The present invention is described in the general context of method steps, which may be implemented in one embodiment by a program product including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated. The features of the embodiments described herein may be combined in all possible combinations of methods, apparatus, computer program products and systems.

What is claimed is:

1. A method comprising:
    deriving a coding mode indicator specifying a partition of enhancement layer block based at least in part on a plurality of reference frame index values corresponding to a plurality of reference layer blocks, the reference layer blocks representing an area in a base layer that, after upsampling, covers the enhancement layer block, wherein the partition's size is determined by merging reference layer blocks that have the same reference frame index and that have motion vectors having a difference metric less than a predetermined threshold, wherein the difference metric is derived by a sum of absolute difference of motion vector components;
    deriving a motion vector associated with the partition of the enhancement layer block, wherein the derived motion vector comprises a weighted average of the motion vectors of the merged reference layer blocks before merging, wherein weights for the weighted average are based on differentials between the motion vectors of the reference layer blocks before merging, partition sizes associated with the reference layer blocks before merging, or a macroblock type or mode associated with the reference layer blocks before merging; and
    encoding the enhancement layer block utilizing the coding mode indicator and the derived motion vector;
    wherein the predetermined threshold is equal to one.

2. The method of claim 1, wherein the merged reference layer blocks have the same motion vectors.

3. The method of claim 1, wherein a plurality of representative pixels for locating corresponding reference layer blocks are used to select partition and motion vector information for each respective reference layer block.

4. The method of claim 1, wherein, if the plurality of reference blocks have different reference frame indices, then the motion vector information from the reference block with the lowest reference frame indices is selected.

5. A computer program product, comprising a non-transitory computer-readable medium storing computer code, the computer code being configured to, upon execution, cause an apparatus to at least
    encode an enhancement layer block representing at least a portion of a video frame within a scalable bit stream by
        deriving a coding mode indicator specifying a partition of the enhancement layer block based at least in part on a plurality of reference frame index values corresponding to a plurality of reference layer blocks, the reference layer blocks representing an area in a base layer that, after upsampling, covers the enhancement layer block, and
        determining the partition's size by merging reference layer blocks that have the same reference frame index and that have motion vectors having a difference metric less than a predetermined threshold, wherein the difference metric is derived by a sum of absolute difference of motion vector components, and
        deriving a motion vector associated with the partition of the enhancement layer block, wherein the derived motion vector comprises a weighted average of the motion vectors of the merged reference layer blocks before merging, wherein weights for weighted average are based on differentials between the motion vectors of the reference layer blocks before merging, partition sizes associated with the reference layer blocks before merging, or a macroblock type or mode associated with the reference layer blocks before merging; and
    encoding the enhancement layer block utilizing the coding mode indicator and the derived motion vector;
    wherein the predetermined threshold is equal to one.

6. An apparatus, comprising: a processor; and a memory communicatively connected to the processor and including computer code, the memory and computer code being configured to, with the processor, cause the apparatus to at least:
    derive a coding mode indicator specifying a partition of an enhancement layer block based at least in part on a plurality of reference frame index values corresponding to a plurality of reference layer blocks, the reference layer blocks representing an area in a base layer that, after upsampling, covers the enhancement layer block;
    determine the partition's size by merging reference layer blocks that have the same reference frame index and that have motion vectors having a different metric less than a predetermined threshold, wherein the difference metric is derived by a sum of absolute difference of motion vector components;
    deriving a motion vector associated with the partition of the enhancement layer block, wherein the derived motion vector comprises a weighted average of the motion vectors of the merged reference layer blocks before merging, wherein weights for the weighted average are based on differentials between the motion vectors of the reference layer blocks before merging, partition sizes associated with the reference layer blocks before merging, or a macroblock type or mode associated with the reference layer blocks before merging; and
    encode the enhancement layer block utilizing the coding mode indicator and the derived motion vector;
    wherein the predetermined threshold is equal to one.

7. The apparatus of claim 6, wherein the merged reference layer blocks have the same motion vectors.

8. The apparatus of claim 6, wherein a plurality of representative pixels for locating corresponding reference layer block are used to select partition and motion vector information for each respective reference layer block.

9. The apparatus of claim 6, wherein, if the plurality of reference blocks have different reference frame indices, then the motion vector information from the reference block with the lowest reference frame indices is selected.

10. An apparatus, comprising:
    a processor configured to
        derive a coding mode indicator specifying a partition of an enhancement layer block based at least in part on a plurality of reference frame index values corresponding to a plurality of reference layer blocks, the reference layer blocks representing an area in a base layer that, after upsampling, covers the enhancement layer block, determine the partition's size by merging the reference layer blocks that have the same reference frame index and that have motion vectors having a difference metric less than a predetermined threshold, wherein the difference metric is derived by a sum of absolute difference of motion vector components, and derive a motion vector associated with the partition of the enhancement layer block, wherein the derived motion vector comprises a weighted average of the motion vectors of the merged reference layer blocks before merging, wherein weights for the weighted average are based on differentials between the motion vectors of the reference layer blocks before merging, partition sizes associated with the references layer blocks before merging, or a macroblock type or mode associated with the reference layer blocks before merging; and an encoder configured to encode the enhancement layer block utilizing the coding mode indicator and the derived motion vector;

wherein the predetermined threshold is equal to one.

11. A method comprising:

deriving a coding mode indicator specifying a partition of an enhancement layer block based at least in part on a plurality of reference frame index values corresponding to a plurality of reference layer blocks, the reference layer blocks representing an area in a base layer that, after upsampling, covers the enhancement layer block, wherein the partition's size is determined by merging the reference layer blocks that have the same reference frame index and that have motion vectors having a difference metric less than a predetermined threshold, wherein the difference metric is derived by a sum of absolute difference of motion vector components;

deriving a motion vector associated with the partition of the enhancement layer block, wherein the derived motion vector comprises a weighted average of the motion vectors of the merged reference layer blocks before merging, wherein weights for the weighted average are based an differentials between the motion vectors of the reference layer blocks before merging, partition sizes associated with the reference layer blocks before merging, or a macroblock type or mode associated with the reference layer blocks before merging; and decoding the enhancement layer block utilizing the coding mode indicator and the derived motion vector;

wherein the predetermined threshold is equal to one.

12. The method of claim 11, wherein the merged reference layer blocks have the same motion vector information.

13. The method of claim 11, wherein a plurality of representative pixels for locating corresponding reference layer blocks are used to select partition and motion vector information for the respective reference layer block.

14. The method of claim 11, wherein, if the plurality of reference blocks have different reference frame indices, then the motion vector information from the block with the lowest reference frame indices is selected.

15. A computer program product comprising a non-transitory computer-readable medium storing computer code, the computer code being configured to, upon execution, cause an apparatus to at least decode an enhancement layer block representing at least a portion of a video frame within a scalable bit stream by:

deriving a coding mode indicator specifying a partition of the enhancement layer block based at least in part on a plurality of reference frame index values corresponding to a plurality of reference layer blocks, the reference layer blocks representing an area in a base layer that, after upsampling, covers the enhancement layer block;

determining the partition's size by merging the reference layer blocks that have the same reference frame index and that have a motion vectors having a difference metric less than a predetermined threshold, wherein the difference metric is derived by a sum of absolute difference of motion vector components;

deriving a motion vector associated with the partition of the enhancement layer block, wherein the derived motion vector comprises a weighted average of the motion vectors of the merged reference layer blocks before merging, wherein weights for the weighted average are based on differentials between the motion vectors of the reference layer blocks before merging, partition sizes associated with the reference layer blocks before merging, or a macroblock type or mode associated with the reference layer blocks before merging; and decoding the enhancement layer block utilizing the coding mode indicator and the derived motion vector;

wherein the predetermined threshold is equal to one.

16. An apparatus, comprising: a processor; and a memory communicatively connected to the processor and including computer code, the memory and computer code being configured to, with the processor, cause the apparatus to at least:

derive a coding mode indicator specifying a partition of an enhancement layer block based at least in part on a plurality of reference frame index values corresponding to a plurality of reference layer blocks, the reference layer blocks representing an area in a base layer that, after upsampling, covers the enhancement layer block;

determine the partition's size by merging the reference layer blocks that have the same reference frame index and that have motion vectors having a difference metric less than a predetermined threshold, wherein the difference metric is derived by a sum of absolute difference of motion vector components;

derive a motion vector associated with the partition of the enhancement layer block, wherein the derived motion vector comprises a weighted average of the motion vectors of the merged reference layer blocks before merging, wherein weights for the weighted average are based on differentials between the motion vectors of the reference layer blocks before merging, partition sizes associated with the reference layer blocks before merging, or a macroblock type or mode associated with the reference layer blocks before merging; and decode the enhancement layer block utilizing the coding mode indicatorand the derived motion vector;

wherein the predetermined threshold is equal to one.

17. The apparatus of claim 16, wherein the merged reference layer blocks have the same motion vectors.

18. The apparatus of claim 16, wherein a plurality of representative pixels are used to select partition and motion vector information for the respective reference layer block.

19. The apparatus of claim 16, wherein, if the plurality of reference blocks have different reference frame indices, then the motion vector information from the block with the lowest reference frame indices is selected.

20. An apparatus, comprising:

a processor configured to derive a coding mode indicator specifying a partition of an enhancement layer block based at least in part on a plurality of reference frame index values corresponding to a plurality of reference layer blocks, the reference layer blocks representing an area in a base layer that, after upsampling, covers the enhancement layer block, determine the partition's size by merging the reference layer blocks that have the same reference frame index and that have motion vectors having a difference metric less than a predetermined threshold, wherein the difference metric is derived by a sum of absolute difference of motion vector components, derive a motion vector associated with the partition of the enhancement layer block, wherein the derived motion vector comprises a weighted average of the motion vectors of the merged reference layer blocks before merging, wherein weights for the weighted average are based on differentials between the motion vectors of the reference layer blocks before merging, partition sizes associated with the reference layer blocks before merging, or a macroblock type or mode associated with the reference layer blocks merging; and a decoder configured to decode the enhancement layer block utilizing the coding mode indicator and the derived motion vector;

wherein the predetermined threshold is equal to one.

* * * * *

UNITED STATES PATENT AND TRADEMARK OFFICE
CERTIFICATE OF CORRECTION

| | | |
|---|---|---|
| PATENT NO. | : 9,049,456 B2 | Page 1 of 1 |
| APPLICATION NO. | : 11/970486 | |
| DATED | : June 2, 2015 | |
| INVENTOR(S) | : Wang et al. | |

It is certified that error appears in the above-identified patent and that said Letters Patent is hereby corrected as shown below:

In the claims:

Column 11,
Line 21, "enhancement" should read --an enhancement--.

Column 12,
Line 11, "weighted" should read --the weighted--.

Column 13,
Line 18, "references" should read --reference--;
Line 43 and 44, "based an differentials" should read --based on differentials--.

Column 15,
Line 21, "blocks merging" should read --blocks before merging--.

Signed and Sealed this
Second Day of February, 2016

Michelle K. Lee
*Director of the United States Patent and Trademark Office*